United States Patent
Devine et al.

(10) Patent No.: US 10,970,136 B1
(45) Date of Patent: Apr. 6, 2021

(54) ADAPTIVE APPLICATION VERSION INTEGRATION SUPPORT

(71) Applicant: Caret Holdings, Inc., Columbus, OH (US)

(72) Inventors: James W. Devine, Columbus, OH (US); Daniel C. Manges, Powell, OH (US); Michael A. Panetta, Grandview Heights, OH (US)

(73) Assignee: Caret Holdings, Inc., Columbus, OH (US)

( * ) Notice: Subject to any disclaimer, the term of this patent is extended or adjusted under 35 U.S.C. 154(b) by 0 days.

(21) Appl. No.: 16/592,314

(22) Filed: Oct. 3, 2019

(51) Int. Cl.
*G06F 9/54* (2006.01)

(52) U.S. Cl.
CPC ........ *G06F 9/541* (2013.01); *G06F 2209/542* (2013.01)

(58) Field of Classification Search
None
See application file for complete search history.

(56) References Cited

U.S. PATENT DOCUMENTS

| | | | | |
|---|---|---|---|---|
| 7,774,404 B2* | 8/2010 | Heidasch | ............... | G06F 9/541 709/201 |
| 8,484,666 B2* | 7/2013 | Berezansky | .......... | H04L 69/162 719/328 |
| 8,661,420 B2* | 2/2014 | Smithline | ............... | G06F 9/541 717/138 |
| 9,063,748 B1* | 6/2015 | Bakale | ...................... | G06F 8/71 |
| 9,262,237 B2* | 2/2016 | Gopalraj | ................. | G06F 9/541 |
| 10,452,455 B1* | 10/2019 | Walters | ................ | G06K 9/6277 |
| 10,536,494 B2* | 1/2020 | Harrington | ......... | G06F 16/9024 |
| 10,769,000 B1* | 9/2020 | Plunk | .................... | G06F 9/3891 |
| 2019/0129765 A1* | 5/2019 | Dubodelov | ............. | G06F 9/541 |

* cited by examiner

*Primary Examiner* — Umut Onat
(74) *Attorney, Agent, or Firm* — Schwegman Lundberg & Woessner, P.A.

(57) ABSTRACT

An Application Programming Interface (API) call that is directed from a first application to a second application is intercepted. A first version number is identified for the first application and a second version number is identified for the second application. One or more transformations are processed on the API call to produce a compatible API call that is compatible with the second application. The compatible API call is provided to the second application for processing on behalf of the first application.

18 Claims, 5 Drawing Sheets

```
when sender=app
{
        If API-endpoint = "server/location1/resource1"
                Return API-endpoint = "serve2/location2/resource1"
}

When sender=service
{
        If responseString = "success"
                Return responseString = "1"
}
```

FIG. 2

ADAPTIVE APPLICATION VERSION INTEGRATION SUPPORT

BACKGROUND

Software engineers have traditionally been limited in the types of updates that can be made to the interface (Application Programming Interface (API)) between a mobile application and a server service that interacts with the mobile application. Solutions that increase the flexibility in making API updates also increase code complexities associated with the API and become increasingly more time consuming to support.

Often times, a software engineer must consider all previous versions of the API that are in existence in order to properly develop updates for each of the versions, which may be necessary when changes are being made to the server service. If many versions of the API exists, the software development becomes virtually impossible to practically achieve in any reasonable time frame. As a result, much-needed changes to fix known problems and/or to add functionality to the server service (and/or API) are either delayed or scrapped and not released at all.

As an organization grows its user base, performance issues and logic problems associated with the organization's network services become more apparent. The growing user base may also begin demanding enhancements to support additional functionality. As the software engineers work to develop and release new versions of the network services to satisfy user concerns/needs, other changes/enhancements detected are queued up for future releases of the network services. Because changes to the network services will often require changes to the API, the organization must continually force the user base to update their mobile applications, and very quickly the API code becomes untoward and difficult or far too complex to change with each additional release. As a result, enhancements and/or bug/performance fixes to the network services are scrapped or substantially delayed by the organization. The organization may then begin to experience a reduction in users as the users move to a competitor or scrap using the associated network services altogether.

BRIEF DESCRIPTION OF THE DRAWINGS

FIG. 2 is a diagram of a sample adapter, according to an example embodiment.

DETAILED DESCRIPTION

In various embodiments, methods and a system for adaptive application version integration support are provided.

According to one aspect, a method for adaptive application version integration support is presented. An Application Programming Interface (API) call is intercepted; the API call is initiated by a first application and directed to a second application. A first version number associated with the first application is identified and a second version number associated with the second application is identified. One or more transformations are processed on the API call based on the first version number and the second version number. A second API call is produced based on processing the one or more transformations. The second API call is provided to the second application for processing on behalf of the first application.

Figure 1:
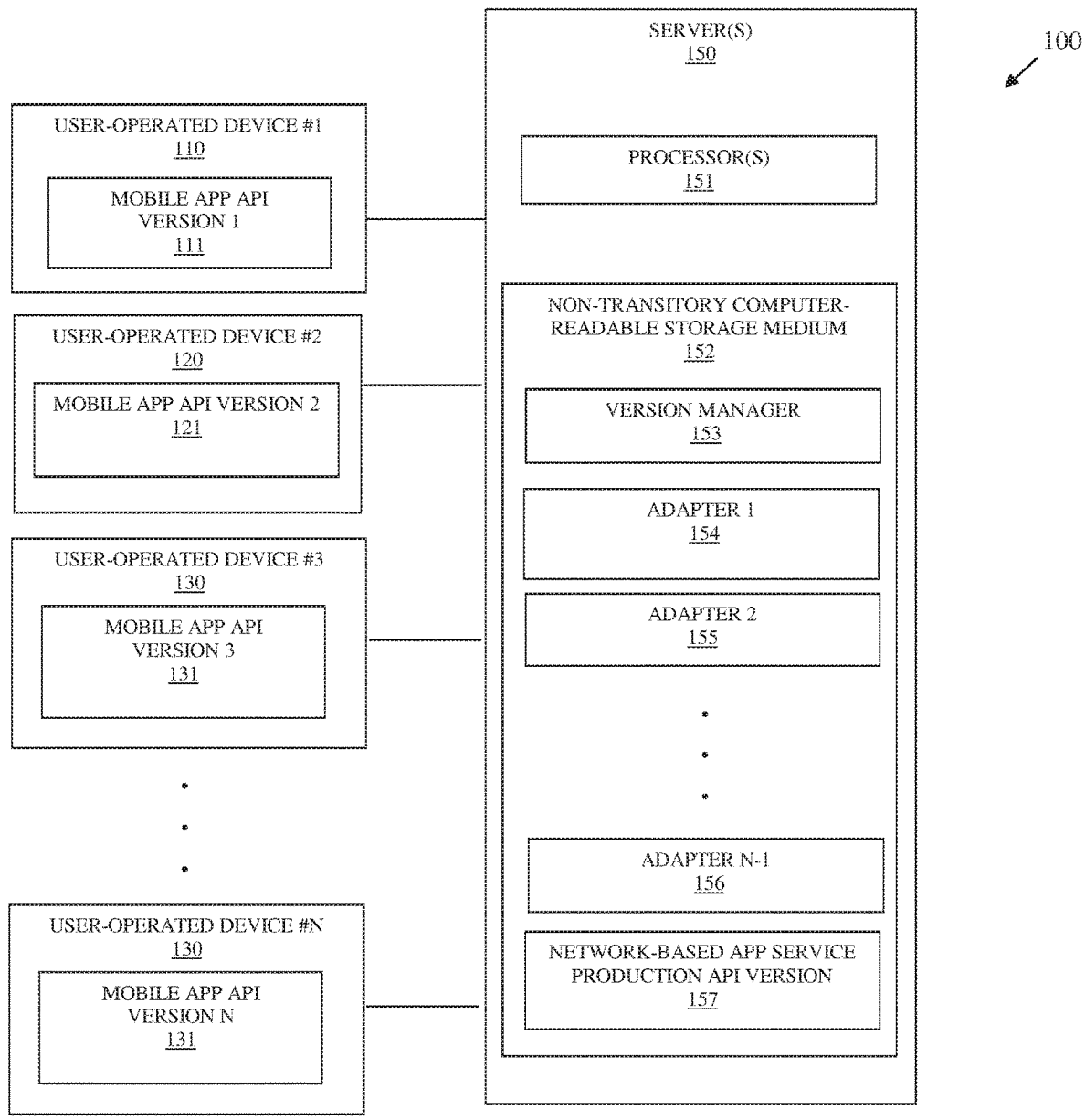
FIG. 1 is a diagram of a system for adaptive application version integration support, according to an example embodiment.

FIG. 1 is a diagram of a system 100 for adaptive application version integration support, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or with less components are possible without departing from the teachings of adaptive application version integration support, presented herein and below.

As used herein and below, the terms "user," "consumer," "user," and "customer" may be used interchangeably and synonymously. The terms refer to an individual operating a user-device and interacting with a user-facing interface of a mobile application (app) or interacting with a web-based user interface to access features/functions of a network-based service (which itself may be accessible through a web or browser-based API).

As will be discussed in detail below, the system 100 permits multiple different mobile application API versions to be supported simultaneously over network connections by a single network service. This is achieved through adapters that transform interface selections/API calls made from the mobile application API versions into API input expected by the network service before the network service receives the input for processing. Similarly, outputs produced by the network service are transformed by the adapters into API outputs which can be processed by each of the mobile application API versions. In this way, changes made to the source code of the API of the network service are decoupled from the source code of the mobile application API versions and coupled through the version API adapters. This allows an organization to isolate API (interface) code changes needed by the mobile app API versions when updates are made to the network service within manageable adapter files, each adapter file corresponding to a specific known mobile app API version being used by customers of the organization when accessing the organization's network service(s).

It is to be noted that use of the word "version" refers to the API used by an application with respect to one or more server-based services. Moreover, although versions are discussed as being Integer numbers that are sequential, this does not have to be the case as a "version" can be any unique identifier for which there is a mapping that identifies whether the API used in that mobile app matches an API used by the server-based services that provides services to the mobile app. In this way, the version can be any string that includes a mapping that allows versions of APIs used by the mobile app to be matched to adapters (as discussed herein and below) for purposes of properly interfacing with the production-based released and available network-based services that support the mobile apps. For purposes of discussion and comprehension herein, versions are referenced as sequential-based Integers that increase by a factor of 1. Again, the factor of increase and the unique string associated with the version can be any scheme and is not explicitly limited to the examples presented herein and below. However, whatever scheme is used there is an ordering between versions, such ordering can be sequential and numeric or based on a mapping, such as through a mapping table.

Moreover, the user-facing version number of the mobile app may be completely different from and disconnected from the mobile app API version with respect to the adapters and the network-based services for the API. For example, a user mobile app may have a user-facing version of 1.2 whereas the adapter version is 4, etc.

In an embodiment, the system 100 supports up to X simultaneous mobile app versions, which can be supported (serviced) by a single current-release of a network service or set of network services. An organization associated with the network service(s) can set X to any desired prior supported releases of the network service(s).

System 100 includes a plurality of processing devices and device types 110-150. The system 100 includes user-operated devices 110-140 and one or more servers 150. Server 150 includes executable instructions that execute on one or more hardware processors 151 of server 150 from a non-transitory computer-readable storage medium 152 as: a version manager 153, adapters (154-156) and a network-based application ("app") service(s) production API version 147 (latest supported release of the production services—herein after just "app service 147").

Each user-operated device 110-140 includes its own processor and non-transitory computer-readable storage media. The media includes executable instructions, which when executed by the corresponding processors cause to perform processing for the mobile app API versions 111-141.

It is to be noted that there may be multiple servers 150, such that the different elements 153-157 may execute on a same server 150 or multiple different servers 150 networked together. Furthermore, multiple servers 150 may be logically cooperating within cloud computing environment and accessible as a single server 150.

Additionally, each element 153-157 may simultaneously process within different independent processing environments as duplicated instances of elements 153-157, each processing environment servicing a different set of the user-operated devices 110-140 for network interaction. A same server 150 may execute different processing environments, such as when the different processing environments are Virtual Machines (VMs) and/or containers. Additionally, at least some of the processing environments may execute on different servers 150 from one another.

During operation of the system 100, a given mobile app API version 1 111 is initiated on user-operated device #1 110, this establishes a network connection between user-operated device #1 110 and server 150. The mobile app API version #1 111 reports its version number when connecting to the server 150 and/or reports its version number with each interface call that is initiated from mobile app API version #1 111.

The reported API version number by the mobile app API version (hereinafter just "app API version") is just a serial number or a unique identifier that the mobile app uses to reports its current working API version. Again, there is no correlation between the user-published mobile app version and the reported API version.

A typical conventional processing workflow between a mobile app and a network service would entail direct interaction between the mobile app and the network service.

Such typical workflow is altered by the teachings herein, such that interactions or API calls made between app API versions (111, 121,131, and 141) and the app service 147 are indirect when a given app API version (111, 121,131, and 141) does not correspond to the production version associated with the app service 147 (detectable based on the API version number reported by the mobile apps and the last released version number for the adapters). Direct interaction can occur between mobile app API version when the app API version is one version higher than the most-recent released adapter version or stated another way when the current supported and released API version used by the app service 157 matches the reported mobile app API version reported by the mobile app.

The version manager 153 identifies a variety of metadata with each interaction between any given app version API and the app service 157. Such metadata includes a mobile app identifier, a mobile app API version number, a last recorded or known adapter version number, a sender identifier (who is initiating the interaction), and a receiver identifier (who is receiving the interaction for response processing). When the API version number in use by the app service 157 is N and there is no adapter N, the version manager 153 performs no adapter-based processing and allows any mobile app API version N 141 to directly interact with app service 153, the APIs calls between app API version N 141 and app service 157 are both compatible and support for session interaction.

So, assuming the current app service 157 supports API version N, there would be no adapter N and mobile app API version #N 141 would have direction interaction with app service 157. If the app API version lacks a corresponding matching identifier associated with any available adapter, then this is an indication to the version manager 153 (based on the lack of any matching adapter identifier for the API version in the adapters) that direct communication, without applying any adapters, can occur. In a similar manner, if the current app service 157 is on API version N+1, indicated by a presence of adapter (not shown in FIG. 1), then mobile app API version #N 141 would indirectly communicate with app service 157 through adapter N using version manager 153.

Initially, a very first app API version 1 111 is released (API version supported by app service 157 is 1), there is no adapter, which is an indication to version manager 153 that direct interaction between app API version 1 111 and app service 157 can be direct and proceed for a session without any API adapter. Now, assume that a second API version is released, which is now reflected in app service 157, this results in adapter 1 154 being released (API version is 2) as well as a new mobile app API version 2 121. Version manager 153 detects a call between the initial and first released app API version 1 111 and app service 157 during a session, the current API version is 2 and the initial and first released app API version 1 111 reports version 1 plus there is now adapter 1 154; accordingly, version manager 153 applies adapter 1 154 to transform calls made between initial and first released app API version 1 111 and app service 157. This makes the API version 1 being used and processed by the initial and first released app API version 1 111 compatible with and supported by app service 157 (which is using API version 2). In this scenario, because the current API version is 2 (V=2), version manager 153 allows direct communication with no API call transformations between app API version #2 121 and app service 157 (which is currently using API version 2).

The version manager 153 determines: whether adapters are needed at all for any given communication between an app API version and app service 157, how many adapters need to be applied serially for any given communication, and an order (serially ascending or serially descending) based on who is the sender of any given communication.

The last known adapter version available from the server 150, the API version associated with a given app API version, the sender, and the receiver are processed by the version manager 153 to determine any adapters that are needed, the number of needed adapters, and the order to apply needed adapters.

The order (ascending or descending) for processing multiple adapters needed is determined by the version manager 153 based on who is the sender in any given communication. If the sender is the app service 157, the order is decreasing or descending. If the sender is an app API version, the order is increasing or ascending. The starting adapter to apply is determined based on the API version associated with the sender and the API version of the receiver.

For example, assume the current API version supported by app service 157 is N=4, the sender is app API version 2 121, and last recorded adapter is adapter 3, which is adapter N-1 156 when N is 4. Version manager 153 intercepts an API call made by app API version 2 121 directed to app service 157, identifies app API version 2 121 as the sender and determines that the order to apply the adapters is ascending. The last known of available adapter is adapter 3 (in this example adapter N-1 156). The starting adapter is the adapter that matches app API version 2 121, which is adapter 2 155 and the number of adapters to apply is just 2 because the last known adapter is adapter 3 (N-1 156). The original API call sent from app API version 2 121 is processed by adapter 2 155 to produce a transformed or modify API call as a first output; the first output is provided as input to adapter 3 (N-1 156) resulting in second output for the original API call. The second output is provided to app service 157 and recognized as a valid API call for API version 4 (N=4 in the example). App service 157 generates first response data and sends to app API version 2 121. Version manager 153 intercepts, identifies the sender as app service 157 and the recipient as app API version 2 121. The adapter order processing is determined to be descending and since the sender is the app service 157, the starting adapter is always the last available adapter, which is adapter 3 (N-1 156). The first response data is processed by adapter 3 (N-1 156) to produce transformed second response data, the second response data is provided as input to adapter 2 155 to produced third response data. The third response data is provided as response data recognized and capable of being processed by app API version 2 121 (for a version 2 of the API).

These examples can continue, such that as any new API version is released (version N) and reflected in the app service 157 a new corresponding adapter N-1 156 is added on server 150 for the last released app API version N-1. Version manager 153 will then use adapter N-1 156 for any interaction between app service 157 and app API version N-1. However, App API version N 141 will have direct interactions with app service 157 since its version number N matches the supported API version of the app service 157 (detectable by version manager 153 because there is no adapter N on server 150).

The version manager 153 supplies the sender's API call as input to a starting adapter (determined as discussed above), if multiple adapters are needed, the version manager 153 provides output produced by the starting adapter as input to the next adapter. The continues until the ending adapter produces a final modification on the original API call. The final modification is provided as a request or a response to the receiver and the final modification corresponds to an API version supported by the receiver.

The version manager 153 knows that no adapter is needed when there is no adapter matching an API version number of the app API version.

The API version number of the app API version maps to a starting version number for any needed adapter (when the app API version is the sender in a communication with the app service 153). In this way, when the API version of the app API version is 1 greater than the last-released adapter (app API version N 141), then that app API version N 141 requires no adapter-based processing and is assumed to match the version number of the app service 157 (this is illustrated in FIG. 1 because the last adapter is adapter N-1 156), such that the app service 157 is also at version N in this example matching app API version N 141. In this way, the API version that is current supported by app service 157 has no adapter matching that API version, such that the most-recently released app API version that works with the supported API version is always 1 greater than the last known adapter.

During a connection between a given app API version 1 111 and the app service 157, a communication session is established. Each session is managed separately/independently from other connections associated with other app API versions (121, 131, and 141). Each session is assigned a corresponding known version number associated with the corresponding connected app API version (111, 121, 131, or 141). In an embodiment, the version number is maintained as metadata associated with the corresponding session.

The version manager 153 intercepts API calls made from a given app API version 1 111 during a corresponding session to the app service 157. Similarly, the version manager 153 intercepts API calls made from the app service 157 during the corresponding session to the given app API version 1 111.

Each API call includes metadata or an identifier that uniquely identifies that API call (command), a sender identifier, a receiver identifier, and a session identifier. At least one of the sender identifier or the receiver identifier will be associated with the app service 157, and the remaining identifier associated with the given app API version 1 111 for the corresponding session. Each API call may also include an associated packet payload having data or information needed or used by that API call (the data or information can include links, processing parameters/options, image data, graphical data, video data, audio data, text data, or various combinations of these types of data or information).

During any API call of any session, the version manager 153 obtains the app API version number along with the sender identifier, the receiver identifier, the API call identifier, and any packet payload. The API version number informs the version manager 153, which adapter (154-156) needs to be processed for that API call before delivering to the receiver, and the API version number informs version manager 153 how many adapters have to be processed/transformed before delivering the API call and any packet payload to the corresponding receiver during the corresponding session.

Each adapter (154-156) includes marked-up transformations/instructions that are specific to a given API version and transforming API calls and any expected packet payload to a next version (ascending and descending). These transformations are instructions that are processed by version manager 153 to ensure any given API call and any expected packet payload are recognized and expected by the receiver, such that the receiver is able to properly process the given sender-provided API call and any given sender-provided packet payload.

A given transformation/instruction statement within a given adapter 1 154 may include a matching API call identifier (label) based on the sender and a replacement API call identifier (label) recognized by the receiver that corresponds or maps to the sender's API call identifier. A given transformation/instruction statement may also include a series of sub-transformation/instruction statements and/or calls to transformation routines.

Version manager 153 may subtract the current version number N associated with the app service 157 (current released and supported version of app service 157 available on server 150) from a given version number of a given session (associated with app API version 1 111, 2 121, or 3 131). The result of the subtraction identifies how many adapters (154-156) have to be processed on the given API call before the resulting transformations can be delivered to the receiver as input or response data for the receiver to process. Version manager 153 determines the order in which the determined number of adapters (154-156) are to be sequentially processed based on the sender identifier. When the sender identifier is associated with one of the app API versions (111, 121, or 131), the order is increasing or ascending. When the sender identifier is associated with app service 157, the order is decreasing or descending. The starting adapter (154, 155, or 156) is always adapter N−1 156 when the sender is the app service 157 (order is descending). The starting adapter (154, 155, or 156) when the sender is one of the app API versions (111, 121, or 131) is the adapter (154, 155, or 156) that corresponds to the version of the sending app API version (111, 121, or 131). For example, when app API version 1 111 is the sender, adapter 1 154 is the starting adapter; when app API version 2 121 is the sender, adapter 2 155 is the starting adapter, etc. (Again, there is no need for any adapter processing when the API version number associated with the app API version has no corresponding adapter—an indication that the app API version is up to date with what is supported by the app service 157.) Notice there is no adapter processed at all when app API version N 141 is the sender, since the version number N matches the version of the app service 157 and can be determined by the version manager 153 based on no presence or alack of presence of any adapter N on server 150.

So, the API version number of a sending app API version (111, 121, and 131) determines the starting adapter (154, 155, and 156) that is first processed by the version manager 153 for a given API call and any given packet payload. In this scenario, based on the difference between the API version number of that sending app API version (111, 121, or 131) and the version number N (version number of the app service 157 and detected because there is no adapter N on server 150 and adding 1 to the last available adapter N−1 156), the version manager 153 determines how many additional adapters (155 and/or 156) need to be processed before the transformed API call and any packet payload are provided to app service 157 for processing. The order is determined as ascending because the sender was a mobile app version (111, 121, or 131).

When the sender is the app service 157, the order is descending, the first adapter processed by the version manager 153 is always adapter N−1 156 (assuming the receiver is not app API version N 141 in which case as explained above no adapter is processed by version manager 153). The last adapter processed in a descending order from N−1 is the adapter that corresponds to the receiving app API version (111, 121, or 131).

It is to be noted that FIG. 1 depicts 3 mobile app versions (111, 121, 131, and 141), which is done for illustration, as there can be just two mobile app versions (111 and 141 (where N is 2)) or there can be up to a configurable number (X) app API versions (111, 121, 131 and continuing for a configurable number of additional iterations to 141). Furthermore, adapter N−1 146 implies that N is at least 5 or more (given the diagram depicted in FIG. 1). Again, this does not have to be the case as there can be just one adapter 156 corresponding to app version 1 111, such that N is 2 and adapter N 156 is adapter 1 154. Furthermore, it is again noted that version manager 153 does not invoke and does not process any adapter 154-156 when the app API version N 141 is engaged in a network session with the app service 157 (since the API version numbers match, there is no adapter N on server 150, and there is no disparity in the API calls between the two during the session).

Each adapter 154-156 includes transformations/instructions for making API calls from one version compatible a next version to process (both ascending and descending based on the sender). So, adapter 1 154 produces (when processed by the version manager 153) transformations that transform input being sent by app API version 1 111 during a session to expected corresponding input that can be processed by an API version 2 of the app service 157. Moreover, adapter 1 154 produces (when processed by version manager 153) transformations that transform output being sent by an API version 2 of the app service 157 into expected corresponding output expected by app API version 1 111. When there is more than 1 difference in API versions between the app API version (111, 121, or 131) and the version of the app service 157, the version manager 153 sequentially processes transformation outputs from one adapter (154, 155, or 156) and provides those outputs as input to a next adapter (154, 155, or 156) until the version number of the last adapter processed matches a version number associated with the receiver. Again, the sequential order (ascending or descending) is determined based on who the sender is for any given API call being processed. When the sender is app API version (111, 121, or 131) the order of applying any needed adapters (154, 155, and/or 156) is ascending, when the sender is the app service 157 the order of applying the needed adapters (156, 155, and/or 154) is descending.

As an example, consider the following scenario where N is 3 (version=3) of app service 157 is released and supported on server 150 by a given organization), such that the last adapter on the server 150 is adapter 2 155. A user operating device #1 110 selects from a user-facing interface of app API version 1 111 option X during a network session with app service 157. Version manager 153 is activated on server 150 upon initiation of the session. The session version number is set to 1 based on mobile app version 1 111. The current support API version for app service 157 is detectable as 3 based on the last adapter on the server being adapter 2 155 by adding 1, since the current API version support is 1 more than the last available adapter on the server 150. Option X is intercepted as an API call. Version manager 153 subtracts API version 1 from API version 4 (version of app service 157) resulting in 2, which indicates the number of adapters that need processed before the API call can be delivered to the app service 157 for processing during the session. The version number of app API version 1 111 is the number 1, which maps to adapter 1 154. The sender identifier is app API version 1 111, so the order is ascending. Version manager 143 obtains the transformation instructions from adapter 1 154 and processes them to obtain output A. Version manager 153 obtains the transformation instructions for adapter 2 155 and applies them on output A to obtain output B. Output B is provided as input B to app service 157 in place of option X. App service 157 produces a response Y to input B. Version manager 153 intercepts Y and obtains reverse transformations instructions from adapter 2 155 to obtain output D. Version manager 153 obtains reverse transformation instructions from adapter 1 154 to obtain output E. Output E is provided as response data to app API version 1 111 based on initial user selection of option X.

The FIG. 2 shows example syntax and semantics associated with an example adapter (154, 155, or 156), according to an example embodiment. It is to be noted that other syntax and semantics may be used that are different from that which is shown for illustration in the FIG. 2.

As illustrated in FIG. 2 under the "when" statement for a resource associated with an API endpoint and, during a transformation from one version to a next version, an API endpoint is renamed when issued from one app API version (111, 121, or 131) to make that API call compatible with a next API version (sender is "app"). The redirection is actually a path location to the API endpoint on server 150, such that results from processing the sample adapter is a call to a different path location on server 140 (location2) to a replacement API endpoint. This permits an older app API version (111, 121, or 131) to make a proper call to the currently supported and needed API endpoint (resource1) and allows the older API endpoint to be removed from server 150 (from location1) without updating the app API version (111, 121, or 131).

The adapter shown in FIG. 2 also replaces a response string sent as a response from the app service 157 to a given app API version (111, 121, or 131) from "success" to "1." The given app API version (111, 121, or 131) knows how to handle and process a "1" response string as an indication of success but is unable to handle and process a "success" response string. Version N of the app service 157 produces the "success" response string, the version manager 153 processes the corresponding adapter N−1 156 resulting in a "1" response string being provided back to the given app API version (111, 121, and 131).

The adapters 154, 155, and 156 provide a mechanism by which compatibility issues between existing app API versions (111, 121, and 131) can be isolated in small easy to manage files, such as the file shown in the FIG. 2. Each file includes instructions that are interpreted by the version manager 153 at runtime to move an API call to a next version of the API call (current version+1 forward) or move the API call to a previous version of the API call (current version−1 backward).

Output from one adapter for processing a given API call can be provided as input to a next adapter to move the original API call to a compatible format that spans more than 1 API version. The adapters can be chained together in this manner for up to a configurable number (X) of previous versions associated with the app service 157.

If the version manager 153 detects an app API version number that is greater than a configurable number (X) of previous versions, the version manager 153 can prompt the app API version to force an update to a newer version of the app API version. This number X is configurable and can be increased or decreased based on the needs of the organization providing the app service 157.

In an embodiment, the adapters 154-156 are files representing programming instructions that are capable of being opened, read, and interrupted in real-time by the version manager 153. In an embodiment, the files are Ruby files.

In an embodiment, the adapters 154-156 are executable scripts passed the API call, sender identifier, receiver identifier, and any packet payload as parameters by the version manager 153.

In an embodiment, the adapters 154-156 are eXtensible Markup Language (XML) files.

In an embodiment, the adapters 154-156 are customized markup language files having a proprietary syntax and statements.

In an embodiment the user-operated devices 110, 120, 130, and 140 can include: phones, tablets, wearable processing devices, and/or intelligent appliances that are part of the Internet-of-Things (IoTs).

In an embodiment, the app service 157 is an insurance service provided by an insurance company to subscribers and potential subscribers.

It is to be noted that the app API version (111, 121, 131, and 141) as described above can be web-based or browser-based user interfaces/applications that interact with the app service 157 in the manners discussed hereinabove and below. Similarly, the app service 157 may be web-based or browser-based.

The above-referenced embodiments and other embodiments are now discussed with reference to the FIGS. 3-5.

Figure 3:
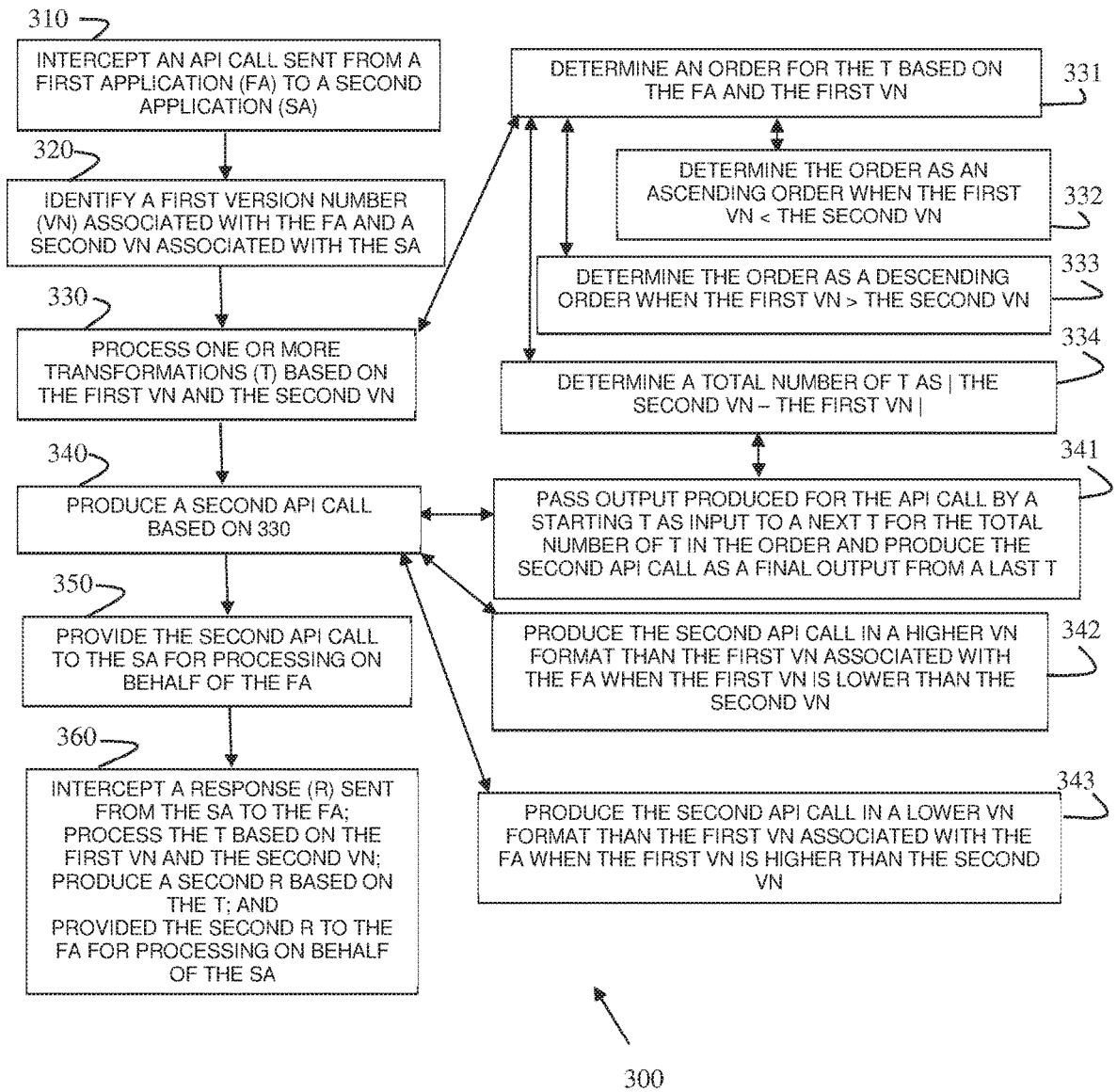
FIG. 3 is a diagram of a method for adaptive application version integration support, according to an example embodiment.

FIG. 3 is a diagram of a method 300 for adaptive application version integration support, according to an example embodiment. The software module(s) that implements the method 300 is referred to as a "version manager." The version manager is implemented as executable instructions programmed and residing within memory and/or a non-transitory computer-readable (processor-readable) storage medium and executed by one or more processors of a device. The processor(s) of the device that executes the version manager are specifically configured and programmed to process the version manager. The version manager may have access to one or more network connections during its processing. The network connections can be wired, wireless, or a combination of wired and wireless.

In an embodiment, the device that executes the version manager is the server 150. In an embodiment, the server 150 is a cloud-based processing environment comprising a collection of physical servers cooperating as a single logical server. In an embodiment, the server 150 is a Local-Area Network (LAN)-based server or a Wide-Area Network (WAN)-based server.

In an embodiment, the version manager is all or some combination of the version manager 153, the adapters 154-156, and/or the network-based app service version N 157.

At 310, the version manager intercepts an API call sent from a first application to a second application. The first and second application are connected for a communication session with one another over a network connection. The version manager is interposed between the first and second application. In an embodiment, the version manager is initiated upon establishment of the session between the first and second applications and is transparently part of the session.

At 320, the version manager identifies a first version number associated with the first application and a second version number associated with the second application. That is both applications include an identifier and/or metadata that permits the release or API version number for software associated with the applications to be identified by the version manager. This can be done in a variety of manners as discussed above. For example, unique identifiers for the applications can be used to look up the API version numbers, or each communication includes metadata that identifies the release or API version number.

At 330, the version manager processes one or more transformations based on the first version number and the second version number. First it is to be noted that if the first version number is equal to the second version number, then the processing is bypassed and the first and second application communicate directly with one another during the session. The transformations (when the version numbers are not equal to one another) change or modify API calls issued from one of the applications (sending application) into other API calls that are recognized and processed, during the session, by the other application (receiving application).

In an embodiment, at 331, the version manager determines an order for the transformations based on the first application and the first version number.

In an embodiment of 331 and at 332, the version manager determines the order as being an increasing or ascending order when the first version number is less than the second version number. This is an indication that the first application is a app API version (111, 121, 131, or 141) that is sending an API call during the session to a second application that is an app service 157, where the version of the first application is not currently up-to-date with the version of the second application (first version number of the first application is less than the second version number of the second application).

In an embodiment of 331 and at 333, the version manager determines the order as being a decreasing of descending order when the first version number is greater than the second version number. This is an indication that the first application is an app service 157 that is sending an API call during the session to a second application that is an app API version (111, 121, 131, or 141), where the version of the second application is not currently up-to-date with the version of the first application (first version number of the first application is greater than the second version number of the second application).

In an embodiment of 331 and at 334, the version manager determines a total number of the transformations that are needed as an absolute value of the difference between the second version number and the first version number.

At 340, the version manager produces a second API call based on output produced from processing the transformations at 330.

In an embodiment of 334 and 340, at 341, the version manager passes output produced for the API call by a starting transformation as input to a next transformation for the total number of transformations in the order; this produces the second API call as a final output from a last processed transformation. That is, the transformations are chained together and processed sequentially for the total number of needed transformations in the order (ascending or descending) for making the final output on the API call match a receiving application.

In an embodiment, at 342, the version manager produces the second API call in a higher version number format than the first version number associated with the first application when the first version number is lower than the second version number. Here, the first application is an app API version (111, 121,131, 141) having a version number that is less than the receiving second application (which is the app service 157). The first application is the sending application during the session and the second application is the receiving application.

In an embodiment, at 343, the version manager produces the second API call in a lower version number format than the first version number associated with the first application when the first version number is higher than the second version number associated with the second application. Here, the first application is the app service 157 that is making an API call to a second application that is an app API version (111, 121, 131, or 141). Again, the first application is the second application during the session and the second application is the receiving application.

At 350, the version manager provides the transformed second API call to the second application for processing on behalf of the first application. The second API call is recognized and processed by the second application during the session.

The processing 310-350 may be iterated during the session between the first application and the second application for all API calls made between the first and second applications. This makes incompatible application versions (seamlessly compatible).

For example, and in an embodiment at 360, the version manager intercepts a response sent from the second application to the first application. The second application produces the response based on processing the second API call. The version manager then processes the transformations (this time in a different order from what was done at 330) based on the first version number and the second version number. The version manager produces a second response based on the final output of the transformations, and the version manager provides the second response to the first application for processing on behalf of the second application.

In an embodiment, the transformations are adapters (154, 155, and/or 156). In an embodiment, each adapter provides forward and backward (reverse) transformations on an API call in a first version X to a second version X+1 (forward) and/or a third version X−1 (reverse).

In an embodiment, a transformation can: replace an API call with a new API call or a new set of API calls (second API call); change a format of the API call to a new format (represented by the second API call); ignore an API call with now action; change codes between the API call with the second API call; and/or change text, links, images, graphics, audio, video between the API call and the second API call.

In an embodiment, the difference between the first version number and the second version number can be up to a configurable number X. So, the first application and the second application can differ from one another by up to X released versions.

Figure 4:
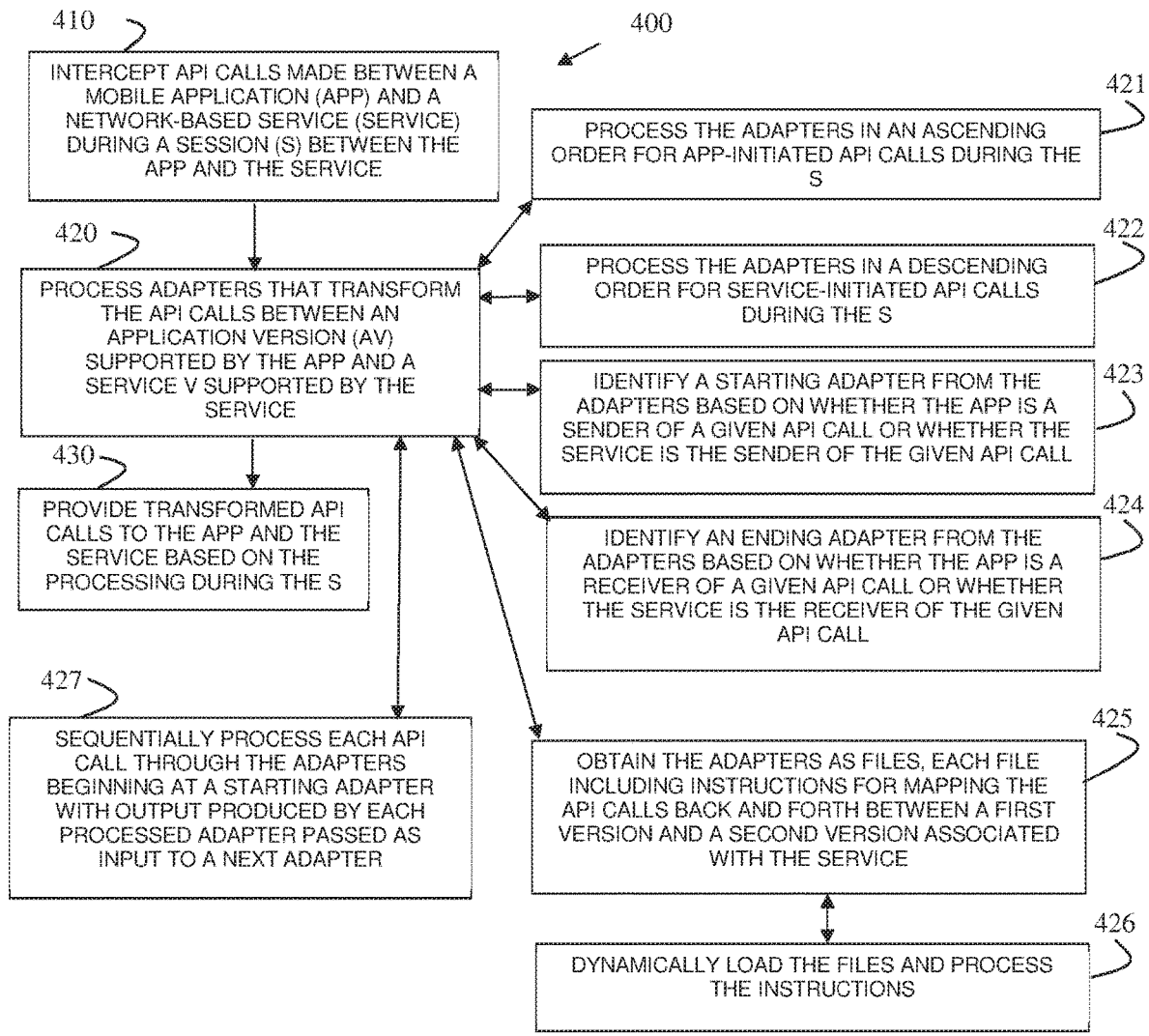
FIG. 4 is a diagram of another method for adaptive application version integration support, according to an example embodiment.

FIG. 4 is a diagram of another method 400 for adaptive application version integration support, according to an example embodiment. The software module(s) that implements the method 400 is referred to as a "version compatibility manager." The version compatibility manager is implemented as executable instructions programmed and residing within memory and/or a non-transitory computer-readable (processor-readable) storage medium and executed by one or more processors of a device. The processors that execute the version compatibility manager are specifically configured and programmed to process the version compatibility manager. The version compatibility manager may have access to one or more network connections during its processing. The network connections can be wired, wireless, or a combination of wired and wireless.

In an embodiment, the device that execute the version compatibility manager is the server 150. In an embodiment, the server 150 is a cloud processing environment, a LAN server, or a WAN server.

In an embodiment, the version compatibility manager is all of, or some combination of: version manager 153, adapters 154-156, and/or the method 300.

The version compatibility manager presents another and, in some ways, enhanced processing perspective of the method 300.

At 410, the version compatibility manager intercepts API calls made between a mobile application (app—such as app API versions 111, 121, or 131) and a network-based service (service—such as app service 157) during a network communication session between the and the service. Again, the version compatibility manager may be initiated when a successful session is established between the app and the service (such as upon detection of a successful login by app to the service). When the version of the app is equal to the version of the service, the version compatibility manager allows the session to continue with no compatibility processing, since in this scenario the app and the service are known to be compatible with one another, such that direct communication between the app and the service occurs during the session. However, when the version number of the app does not match the version number of the service during the session, the version compatibility manager is engaged and performs the processing 410-430 as discussed herein.

At 420, the version compatibility manager processes adapters (such as adapters (154, 155, and/or 156) that transform the API calls between an application version supported by the app and a service version supported by the service.

In an embodiment, at 421, the version compatibility manager processes the adapters in an ascending (increasing) order for app-initiated API calls made by the app to the service during the session. Here, the sender of any given API call is the app.

In an embodiment, at 422, the version compatibility manager processes the adapters in a descending (decreasing) order for service-initiated API calls made by the service to the app during the session. Here, the sender of any given API call is the service.

In an embodiment, at 423, the version compatibility manager identifies a starting adapter from the adapters based on whether the APP is a sender of a given API call or whether the service is the sender of the given API call. When the service is the sender, the starting adapter is the service version number minus 1. When the app is the sender, the starting adapter matches the app version number.

In an embodiment, at 424, the version compatibility manager identifies an ending adapter from the adapters based on whether the app is a receiver of a given API call or whether the service is the receiver of the given API call. When the receiver is the service, the ending adapter is the service version number minus 1. When the receiver is the app, the ending adapter matches the app version number.

In an embodiment, at 425, the version compatibility manager obtains the adapters as files. Each file including instructions for mapping or transforming API calls back and forth between a first version (V+1) and a second version (V−1) associated with the service.

In an embodiment of 425 and at 426, the version compatibility manager dynamically loads the files and processes the instructions (interprets the software instructions defined in the files and processes them).

In an embodiment, at 427, the version compatibility manager sequentially processes each API call through the adapters beginning at a starting adapter with output produced by each processed adapter for the processed API call passed as input to a next adapter. The adapters are chained together.

At 430, the version compatibility manager provides transformed API calls to the app and the service based on the processing of 420 during the session.

One now appreciates how incompatible versions of a mobile app can be supported for a single released network service. Each transformation between two versions (V+1 (forward) and V−1 (backward)) encapsulated within a single adapter.

In an embodiment, the service version number is up to 10 versions higher than the app version number.

In an embodiment, the version compatibility manager simultaneously supports multiple different mobile apps, where the mobile apps comprise a plurality of different version numbers, some of which are the same as the service version number and some of which are different from the service version number and the mobile app version number.

Figure 5:
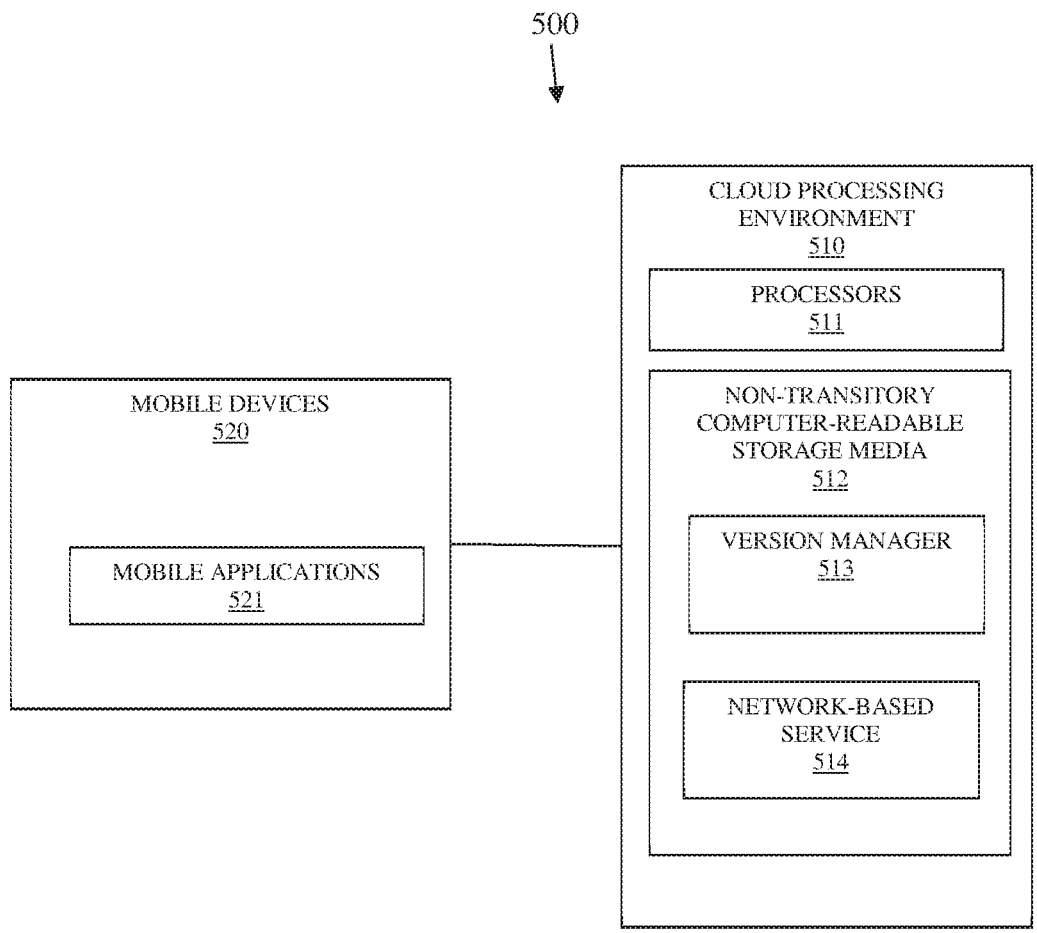
FIG. 5 is a diagram of another system for adaptive application version integration support, according to an example embodiment.

FIG. 5 is a diagram of another system 500 for adaptive application version integration support, according to an example embodiment. The system 500 includes a variety of hardware components and software components. The software components of the system 500 are programmed and reside within memory and/or a non-transitory computer-readable medium and execute on one or more processors of the system 500. The system 500 communicates over one or more networks, which can be wired, wireless, or a combination of wired and wireless.

In an embodiment, the system 500 implements, inter alia, the processing described above with the FIGS. 1-4.

The system 500 includes: a cloud processing environment 510 comprising processors 511 and non-transitory computer-readable storage media 512. The media 512 comprising executable instructions representing a version manager 513 and a network-based service 514. The system 500 interacts with a plurality of mobile applications 521, each mobile application (app) executing as executable instructions from non-transitory computer-readable storage media by a processor of a mobile device 520. The mobile app 521 associated with a release or version number that does not match a release or version number associated with the network-based service 514.

In an embodiment, the version manager 513 is all or some combination of: version manager 153, adapters 154-156, the method 200, and/or the method 300.

In an embodiment, the network-based service 514 is the app service 157.

In an embodiment the mobile apps are app API versions 111, 121, 131, and 141.

The network-based service 514 when executed by at least one of the processors 511 from the non-transitory computer-readable storage media 512 cause the at least one processor 511 to: 1) interact with a mobile app 521 that executes on the mobile device 520 using API calls associated with a released version of the network-based service 514; and 2) provided one or more services to the mobile app 521 through the API calls.

The version manager 513 when executed by at least one of the processors 511 from the non-transitory computer-readable storage media 512 cause the at least one processor 511 to: 1) intercept mobile-app API calls associated with a different version of the network-based service 514 before the network-based service 514 obtains the mobile-application API calls; 2) intercept network-based service API calls provided by the network-based service 514 before the mobile application 521 obtains the network-based service API calls; 3) process adapters that make the mobile-application API calls compliant with the released version of the network-based service 514 and supply compliant mobile-application API calls to the network-based service 514 for processing and providing the one or more services; and 4) process the adapters that make the network-based service API calls compliant with the different version of the network-based service 514 and supply compliant network-based service API calls to the mobile application 521.

In an embodiment, the adapters are the adapters 154, 155, and/or 156.

In an embodiment, the adapters are in a syntax and semantics as what was illustrated in the FIG. 2.

In an embodiment, each adapter is a file that comprises instructions for mapping the network-based service API calls and the mobile-application API calls between two versions associated with the network-based service 514. In an embodiment, each adapter includes instructions for transforming API calls from a mobile-app API version to V+1 (forward transformation) and V−1 (reverse or backward transformation). The adapters are chained together and processed by the version manager 513. For example, if the mobile app API version number is 1 and the network-based service API version number is 4. The version manager 513 processes adapters 1 to get to version 2, adapter 2 to get to version 3, and adapter 3 to get to version 4 when the sender is the mobile application 521. When the sender is the network-based service 514, the version manager 513 processes adapter 3 to get to version 3, adapter 2 to get to version 2, and adapter 1 to get to version 1.

In an embodiment, the version manager 513, when executed by the at least one processor 511 from the non-transitory computer-readable storage medium 512 further causes the at least one processor to 511: dynamically interpret and process each file's instructions when processing each adapter.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
    intercepting an Application Programming Interface (API) call initiated by a first application and directed to a second application;
    identifying a first version number associated with the first application and a second version number associated with the second application;
    processing one or more transformations on the API call based on the first version number and the second version number, wherein processing further includes determining an order for processing the transformations based on the first application and the first version number, and wherein determining further includes determining a total number of the transformations to process as an absolute value of a difference between the second version number and the first version number;
    producing a second API call based on the one or more transformations; and
    providing the second API call to the second application for processing on behalf of the first application.

2. The method of claim 1 further comprising:
    intercepting a response sent from the second application to the first application;
    processing the one more transformations on the response based on the first version number and the second version number;
    producing a second response based on the one or more transformations; and
    providing the second response to the first application for processing on behalf of the second application.

3. The method of claim 1, wherein determining further includes determining the order as an ascending order when the first version number is less than the second version number.

4. The method of claim 1, wherein determining further includes determining the order as a descending order when the first version number is greater than the second version number.

5. The method of claim 1, wherein producing further includes passing output produced for the API call by a starting transformation as input to a next transformation for the total number of transformations in the order and produce the second API call as a final output from a last transformation.

6. The method of claim 1, wherein producing further includes producing the second API call in a higher version number format than the first version number associated with the first application when the first version number is lower than the second version number.

7. The method of claim 1, wherein producing further includes producing the second API call in a lower version number format than the first version number associated with the first application when the first version number is higher than the second version number.

8. A method, comprising:
    intercepting Application Programming Interface (API) calls made between a mobile application and a network-based service during a session between the mobile application and the network-based service;
    processing adapters that transform the API calls between an application version supported by the mobile application and a service version supported by the network-based service, wherein processing further includes determining an order for processing the adapters based on who are senders of the API calls, the application version, and the service version, and wherein determining further includes determining a total number of the adapters to process as an absolute value of a difference between the application version and the service version; and providing transformed API calls to the mobile application and the network-based service based on the processing during the session.

9. The method of claim 8, wherein processing further includes processing the total number of the adapters in an ascending order as the order for mobile-application initiated API calls where the senders are the mobile application during the session.

10. The method of claim 8, wherein processing further includes processing the total number of the adapters in a descending order as the order for network-based service-initiated API calls wherein the senders are the network-based service during the session.

11. The method of claim 8, wherein processing further includes identifying a starting adapter from the adapters based on whether the mobile application is a sender of a given API call or whether the network-based service is the sender of the given API call.

12. The method of claim 8, wherein processing further includes identifying an ending adapter from the adapters based on whether the mobile application is a receiver of a given API call or whether the network-based service is the receiver of the given API call.

13. The method of claim 8, wherein processing further includes obtaining the adapters as files, each file including instructions for mapping the API calls back and forth between a first version and a second version associated with the network-based service.

14. The method of claim 13, wherein obtaining further includes dynamically loading the files and processing the instructions.

15. The method of claim 8, wherein processing further includes sequentially processing each API call through the adapters beginning at a starting adapter with output produced by each processed adapter passed as input to a next adapter.

16. A system, comprising:
a cloud-computing environment comprising at least one server having at least one processor and a non-transitory computer-readable storage medium having executable instructions representing a version manager and a network-based service;
the network-based service when executed by the at least one processor from the non-transitory computer-readable storage medium causes the at least one processor to perform operations comprising:
interacting with a mobile application that executes on a mobile device using API calls associated with a released version of the network-based service; and
providing one or more services to the mobile application through the API calls;
the version manager when executed by the at least one processor from the non-transitory computer-readable storage medium causes the at least one processor to perform operations comprising:
intercepting mobile-application API calls associated with a different version of the network-based service before the network-based service obtains the mobile-application API calls;
intercepting network-based service API calls provided by the network-based service before the mobile application obtains the network-based service API calls;
processing adapters that make the mobile-application API calls compliant with the released version of the network-based service and supply compliant mobile-application API calls to the network-based service for processing and providing the one or more services; and
processing the adapters that make the network-based service API calls compliant with the different version of the network-based service and supply compliant network-based service API calls to the mobile application;
wherein processing the adapters that make the mobile-application API calls and the network-based service API calls compliant further includes determining an order for processing the adapters based on who are senders of the network-based service API calls, the different version, and the released version, and wherein determining further includes determining a total number of the adapters to process as an absolute value of a difference between the released version and the different version.

17. The system of claim 16, wherein each adapter includes instructions for mapping the network-based service API calls and the mobile-application API calls between two versions associated with the network-based service.

18. The system of claim 17, wherein each adapter is a file comprising file instructions, and wherein the version manager when executed by the at least one processor from the non-transitory computer-readable storage medium further causes the at least one processor to:
dynamically interpret and process each file's corresponding file instructions when processing each adapter.

* * * * *